United States Patent [19]
Hicks

[11] Patent Number: 5,957,032
[45] Date of Patent: Sep. 28, 1999

[54] AIR-OPERATED BRAKE ACTUATOR MOUNTING

[75] Inventor: William J. Hicks, Muskegon, Mich.

[73] Assignee: Neway Anchorlok International, Inc., Muskegon, Mich.

[21] Appl. No.: 08/914,374

[22] Filed: Aug. 19, 1997

Related U.S. Application Data

[63] Continuation of application No. PCT/US95/11296, Sep. 7, 1995.

[51] Int. Cl.[6] .............................. F01B 7/00; F01B 29/00
[52] U.S. Cl. .................. 92/63; 92/128; 92/146; 92/161
[58] Field of Search ................... 92/48, 59, 49, 92/63, 100, 128, 146, 161, 64; 180/170

[56] References Cited

U.S. PATENT DOCUMENTS

| | | |
|---|---|---|
| 3,696,711 | 10/1972 | Berg et al. .................. 92/63 X |
| 3,712,178 | 1/1973 | Hensley ........................ 92/63 X |
| 3,842,716 | 10/1974 | Swander, Jr. ................... 92/63 |
| 5,002,164 | 3/1991 | Bowyer . |
| 5,016,523 | 5/1991 | Bowyer ....................... 92/63 |
| 5,364,062 | 11/1994 | Doyle, Jr. et al. . |

FOREIGN PATENT DOCUMENTS

| | | |
|---|---|---|
| 0 096 467 | 12/1983 | European Pat. Off. . |
| 2 261 472 | 5/1993 | United Kingdom . |

*Primary Examiner*—Hoang Nguyen
*Attorney, Agent, or Firm*—Rader, Fishman, Grauer & McGarry

[57] ABSTRACT

Brake actuator housings (120) are provided with mounting studs (105, 125) which are spaced from each other a standard predetermined distance so that smaller brake actuators can be mounted to a bracket (5) on a vehicle by way of the same apertures (108) as larger brake actuators.

27 Claims, 3 Drawing Sheets

AIR-OPERATED BRAKE ACTUATOR MOUNTING

This application is a continuation of International Application No. PCT/US95/11296 filed on Sep. 7, 1995.

BACKGROUND OF THE INVENTION

1. Field of the Invention

The invention relates to air-operated brake actuators of the type mounted on a bracket by means of mounting studs which extend from an actuator housing.

2. Background Art

A typical air brake system for a vehicle such as a bus, truck, or the like includes separate brake assemblies such as a brake shoe and drum at the vehicle wheels. The brake shoes are actuated in one direction to apply the brakes and in the other direction to release the brakes. The brake assemblies may serve as both service and emergency brakes, and individual brake actuators are located adjacent the wheels for actuation of the brake means.

A typical brake actuator includes a service brake actuator for applying and releasing the brakes in response to delivery and exhaust of compressed air. Often a spring brake actuator is disposed in tandem with the service brake actuator. The spring brake actuator uses the force of a strong compression spring to operate the service brake actuator and to apply the brakes when air in a spring chamber is reduced below some predetermined level. Air may be reduced in the spring brake actuator under the control of the operator in the manner of a parking brake, or automatically in emergencies such as a failure of portions of the brake air system.

Brake actuators typically employ diaphragms that move in response to air pressure and springs. The diaphragms in turn move push rods in reciprocating fashion which move the brake means between operative and inoperative positions. Typically, the push rod is pivotally attached to a slack adjuster which is splined to a camshaft having a cam which applies the brake shoes to the brake drum as the cam is rotated. The slack adjuster acts as a lever to amplify the force generated by air pressure in the brake actuator.

The brake actuator is usually mounted to the vehicle by means of a bracket securely fixed to the axle carrying the wheels to be braked. The push rod typically extends through an aperture in the brake actuator, as well as a corresponding aperture in the mounting bracket.

Various sizes of air brake actuators are available for installation on trucks and buses and the like, and the size of a unit selected for installation depends in part upon the weight of the vehicle and the number of brake assemblies to be used. Two commonly available smaller sizes in the industry are the so-called 12-inch and 16-inch actuators, with the numerals "12" and "16" typically referring to a nominal effective area in square inches of the diaphragm in the service brake chamber. A brake actuator housing is typically secured to the mounting bracket by means of mounting studs or bolts extending through the end wall of the service brake chamber on opposing sides of the push rod. The mounting studs in brake actuators sized 20-inch and above are spaced from each other a standard distance, typically 4.75 inches. On the other hand, brake actuators smaller than 20-inch have heretofore had mounting studs separated a lesser distance because of the smaller diameter of the housing.

In order to accommodate brake assembly housings of at least two different sizes, e.g., 12-inch and 16-inch, brackets have incorporated two separate sets of hole patterns to accommodate the different mounting stud spacings. The multiple unused holes on the bracket face are prime locations for surface discontinuities and stress risers which tend to shorten the useful life of the brackets. It would be advantageous to extend the standard spacing of mounting studs to smaller-sized brake actuators, and thus eliminate the need for additional holes on the mounting bracket. In addition, consolidation of attachment hardware to one size can be achieved.

SUMMARY OF THE INVENTION

In accordance with the present invention, mounting studs are mounted to housings of different sizes in such a fashion that the two mounting studs on different housings are spaced apart from each other by the same distance on housings with different circumferential measurements and consequently different diameters. In accordance with the invention, mounting studs are mounted in a larger one of the housings through apertures and are spaced apart by a predetermined amount. In the smaller housings, the studs are mounted external to the housing and separated by the same predetermined distance. The smaller housings are preferably provided with indentations in the side wall and end wall of the housing to provide a mounting area for the studs adjacent the outer perimeter. The studs may be secured internal to the larger housing or external to the smaller housing by welding or other suitable means. The mounting studs of the two different housings are preferably the same diameter.

Advantageously, in the arrangement of the present invention, only a single set of holes has to be formed in the brake actuator housing support bracket which will avoid the structural weaknesses introduced by the multiplicity of holes in the prior art bracket and extend the service life of the bracket. Additionally, the reduced number of holes will mean a savings in cost of production of the bracket. The bracket is typically formed by means of a complex tool having a number of punches corresponding to the number of holes that need to be punched. The bracket with fewer number of holes requires fewer punches and a smaller press since only half as many holes are punched at any one time. By designing the mounting studs to be of all the same diameter, the number of fasteners and different torque requirements are standardized with a smaller likelihood for errors in installation. Additionally, the larger stud center pattern on smaller-sized housings provides a better leveraged joint with better vibration resistance. Yet further, the welded attachment improves stress distribution of the forces into the walls of the housing. Consequently, it is possible to save material costs by reducing the thickness of housing walls.

DETAILED DESCRIPTION OF THE PREFERRED EMBODIMENT

Figure 1:
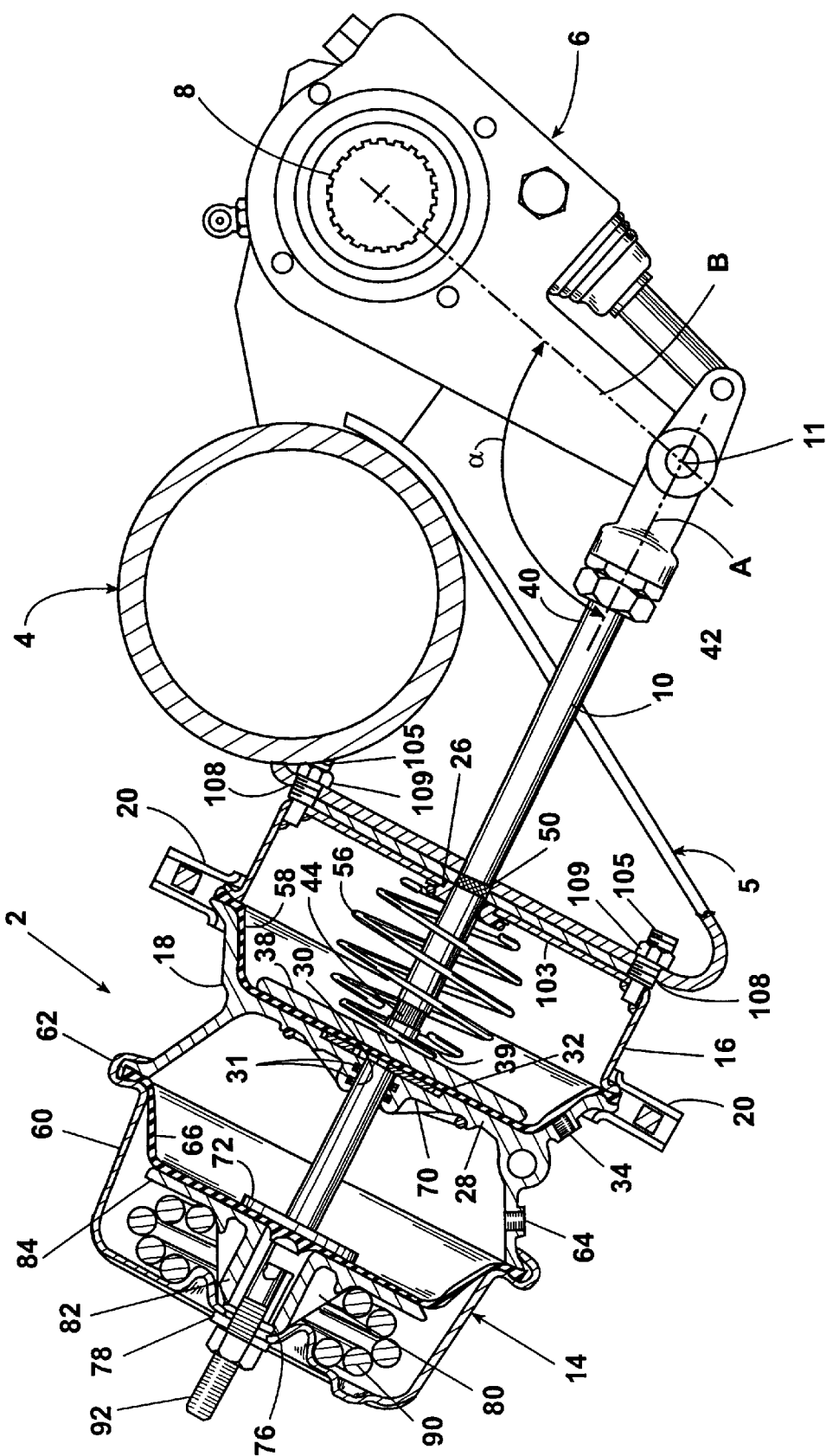
FIG. 1 is a cross-sectional view of an air-operated diaphragm brake actuator according to the invention and slack adjuster mounted to a vehicle.

Referring now to the drawings, and to FIG. 1 in particular, there is shown an air-operated diaphragm brake actuator assembly 2 of a type well known in the art. The brake actuator assembly 2 is mounted to an axle 4 of a vehicle (not shown) by means of a mounting bracket 5. The brake actuator assembly 2 is further adapted to operate a conventional brake shoe and drum (not shown) by means of a slack adjuster 6 splined to a camshaft 8 in conventional fashion. The push rod 10 extends to and pivotally connects with the slack adjuster 6 by suitable pivoting means 11.

The air-operated diaphragm brake actuator 2 comprises a service brake chamber 12 and a spring brake chamber 14 joined in tandem. The service brake chamber 12 comprises a cup-shaped service housing 16 and a double cup-shaped service/spring adapter housing 18 joined by a clamp 20 and forming a hollow interior chamber. A rolled lip or similar integrally formed flange can be substituted for the clamp 20. Bolts 24 are provided to fasten the housing 16 to the brackets on the axle 4. A central opening 26 and side openings 27 are also provided in the service housing 16.

The service/spring adapter housing 18 forms a divider wall 28 and has a central opening 30 with one or more O-rings 31 positioned therein. An aperture 34 is provided in the adapter housing 18 for providing communication between a source of pressure (not shown) and the interior of the service brake chamber 12. A service brake push rod 10 is mounted in the service brake chamber 12 for reciprocation within the opening 26 and carries a pressure plate 38 at an inner end 39 thereof. An outer end 40 of the push rod 10 is journaled into a bracket means 42 for connection to the braking system. A compression spring 56 extends between a central portion of the service housing 16 and the pressure plate 38 to bias the pressure plate 38 and thus the service brake push rod 10 to the fully retracted position as viewed in FIG. 1.

The fully-retracted position may be defined as the inoperative position in which the brakes are released. A first elastomeric diaphragm 58 (also known as the service brake diaphragm) is mounted within the service brake chamber 12 and is clamped between the service housing 16 and the service/spring adapter housing 18. The spring-biased pressure plate 38 forces the diaphragm 58 against the divider wall 28 of the service/spring adapter housing 18 to the inoperative position as shown in FIG. 1.

When air is supplied through the aperture 34 as, for example, when the brakes are applied by a vehicle operator, air pressure is introduced between the diaphragm 58 and the divider wall 28, thereby forcing the diaphragm 58 toward the central portion of the service housing 16. In this manner, the push rod 10 is reciprocated to an operative position causing the slack adjuster 6 to act as a lever so that the camshaft 8 rotates, applying braking pressure to the vehicle brake shoes and drum in a conventional fashion. Thus, the operative position is the maximum adjusted extension of the push rod exterior to the service brake housing.

The spring brake chamber 14 comprises a side of the service/spring adapter housing 18 and a spring housing 60 which is secured to the service/spring adapter housing 18 by a formed seal 62. Alternatively, a clamp similar to clamp 20 may be used to secure the spring housing to the service/spring adapter bearing 18. An aperture 64 is provided within the service/spring adapter housing 18 to connect the interior of the spring brake chamber 14 with a source of pressure (not shown). A second elastomeric diaphragm 66 (known as the spring diaphragm) is suspended within the spring brake chamber between the service/spring adapter housing 18 and the spring housing 60. An adapter push rod 68 is mounted within the spring brake chamber 14 and has a reaction plate 70 attached to one end and a pressure plate 72 attached to the other end thereof. The adapter push rod 68 extends through the opening 30 in sealing engagement with the O-ring 31. The reaction plate 70 seats within the annular depression 32 of the divider wall 28.

A strong force compression spring 90 is positioned between the pressure plate 84 and the spring housing 16 to bias the push rod 10 to an operative position. Ordinarily, air pressure within the spring brake chamber 14 overcomes the force of the compression spring 90 to maintain the latter in a retracted position as illustrated in FIG. 1.

A release tool 92 may be used to cage the spring 90 by mechanically drawing the receptacle plate 80 into the fully-retracted position illustrated in FIG. 1 in the event of an air pressure failure within the spring chamber 14 or if there is a need to dismantle the spring brake for service.

In operation of the spring brake actuator, air pressure is continually supplied to a portion of the spring brake chamber 14 between the service/spring adapter housing 18 and the diaphragm 66 to maintain the spring diaphragm 66, and thus the push rod 10, essentially in the retracted position illustrated in FIG. 1. In this position, the push rod 10 normally would be operated as described above by selective pressurization of air into the service brake chamber through the aperture 34. However, in the event of failure of the air pressure system or by application of a parking brake (not shown), the pressure in the spring chamber will be decreased so that it is no longer able to overcome the force of the much larger and stronger compression spring 90. Thus, the pressure plate 72 forces the spring diaphragm 66, and thus the adapter push rod 68, in a direction along a longitudinal axis of the push rod 68, thereby also forcing the push rod 10 to an operative position applying the braking pressure to the brakes.

Figure 2:
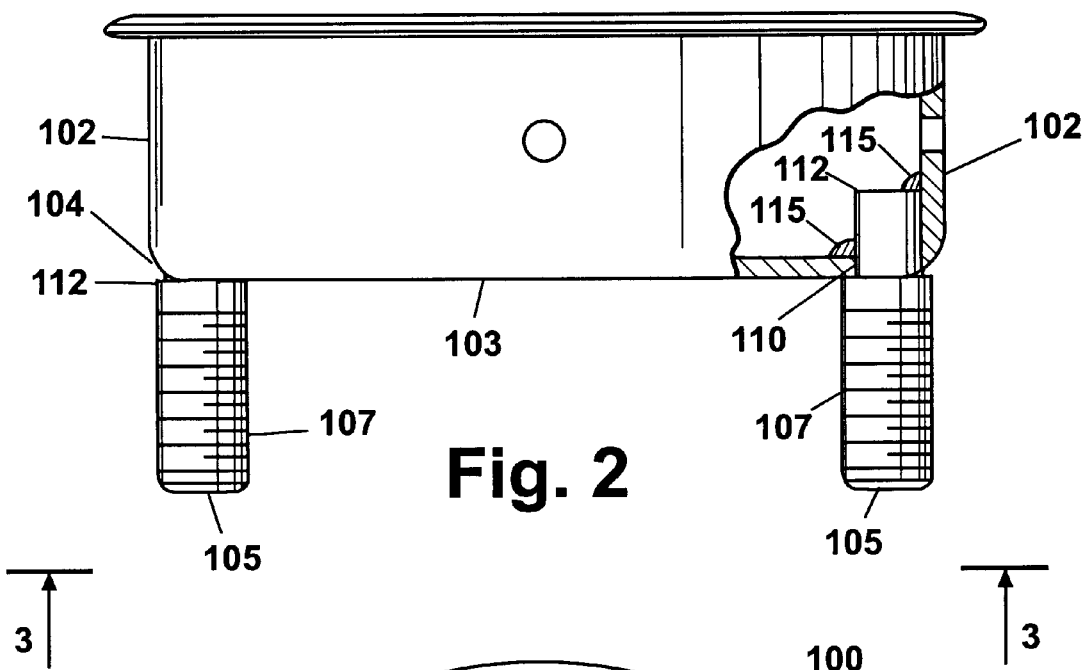
FIG. 2 is a partial, breakaway, enlarged, side view of the service brake housing section of FIG. 1 showing installation of mounting studs through the housing in accordance with the invention.

Turning now to FIG. 2, the housing 16 has circumferential side walls 102 which extend at substantially a right angle to the end wall 103 with a curved area 104 between the side wall 102 and the end wall 103. Mounting studs 105 are each provided with a threaded section 107 adapted to extend through appropriately dimensioned apertures or holes 108 in bracket 5 and to receive a self-locking, threaded nut 109 or the like (see FIG. 1). The end wall 103 of the housing 16 is provided with an appropriately dimensioned opening 110 for receiving a reduced diameter end section 112 of the stud 105. The end section 112 is preferably fastened to the end wall 103 and the side wall 102 by means of welding as depicted at 115.

Figure 3:
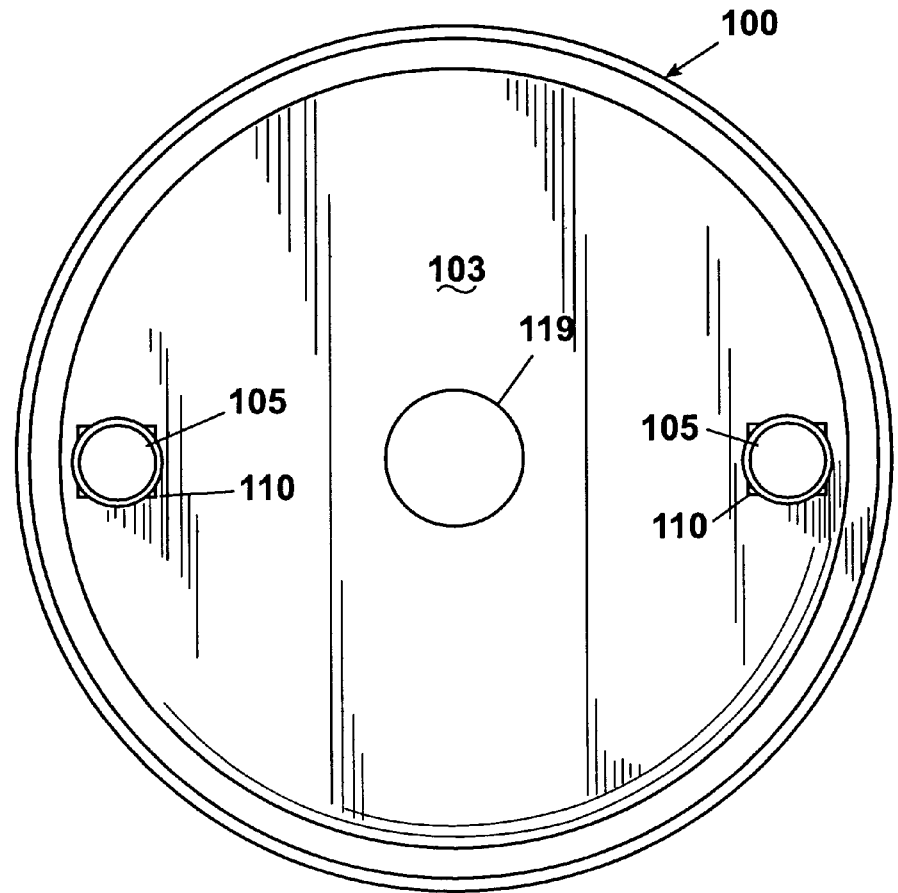
FIG. 3 is an end view of the housing section taken along line 3—3 of FIG. 2.

FIG. 3 is an end view of the housing 16 showing a central aperture 119 which is provided to accommodate the push rod 10 of FIG. 1. As depicted in FIG. 3, the openings 110 in the end wall 103 may be square holes obtained in a standard fashion by a punching operation or may be drilled in a standard fashion. It will be understood that the openings 110 may be any shape, e.g., oblong or circular.

Figure 4:
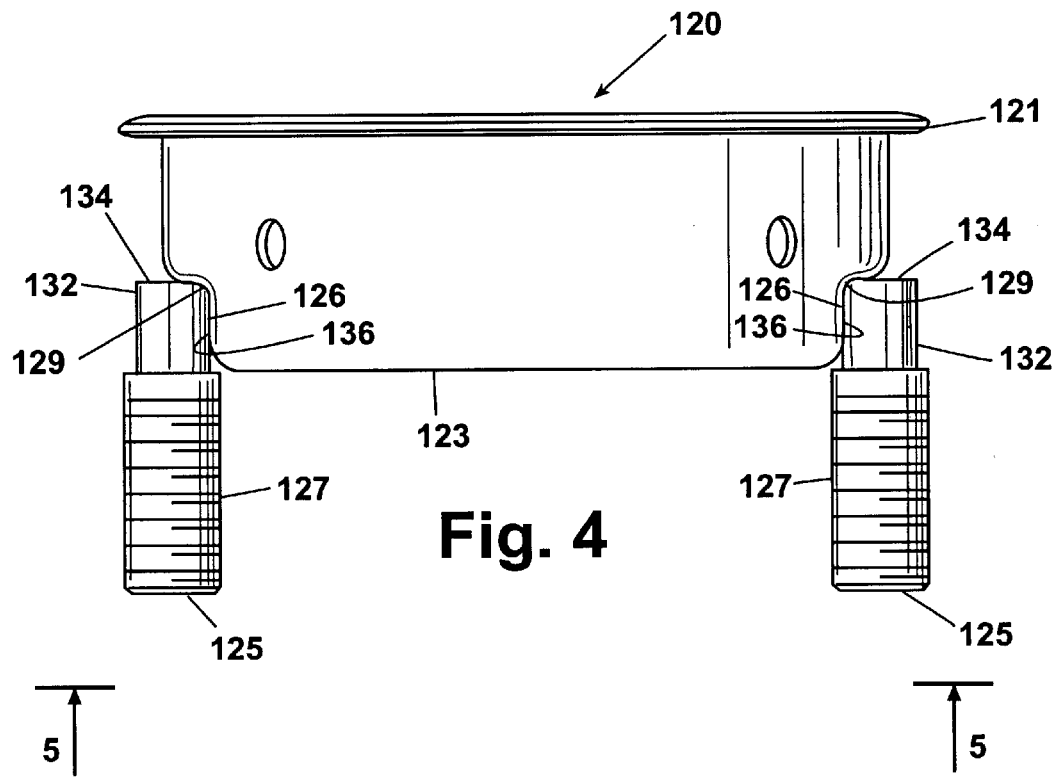
FIG. 4 is a side view of a service brake housing section with mounting studs mounted external to the housing.

The housing 16 of FIGS. 2 and 3 represents a larger of two standard housings in which the mounting studs are mounted through the end wall and attached to the interior surface of the housing. FIG. 4 shows a smaller housing 120 and a pair of mounting studs 125. Yet, the distance between the centers of the mounting studs 125 is identical to that of the mounting studs 105 in the embodiment of FIG. 2, to allow the two units to be interchangeably mounted in the same mounting holes of the bracket 5.

The studs 125 are each provided with a threaded section 127 and a reduced diameter section 132. The housing 120 has a reduced diameter outer section 126, and the reduced diameter sections 132 of the studs 125 are partially mounted on the outer circumferential side wall 136 of the reduced diameter outer section 126. The reduced section 132 of the mounting stud 125 is preferably provided with a curved section 129 engaging a curved area of the side wall 136. The studs 125 may be fastened to the external surface of the side wall 136 and the curved section 129 by welding along the side wall 136 and a side of each stud, as well along a portion of the end wall 134 of the studs 125 adjacent the curved section 129 of side wall 136. The reduced section 132 of the stud is preferably square to provide a greater surface area for welding to the reduced diameter outer section 126.

Figure 5:
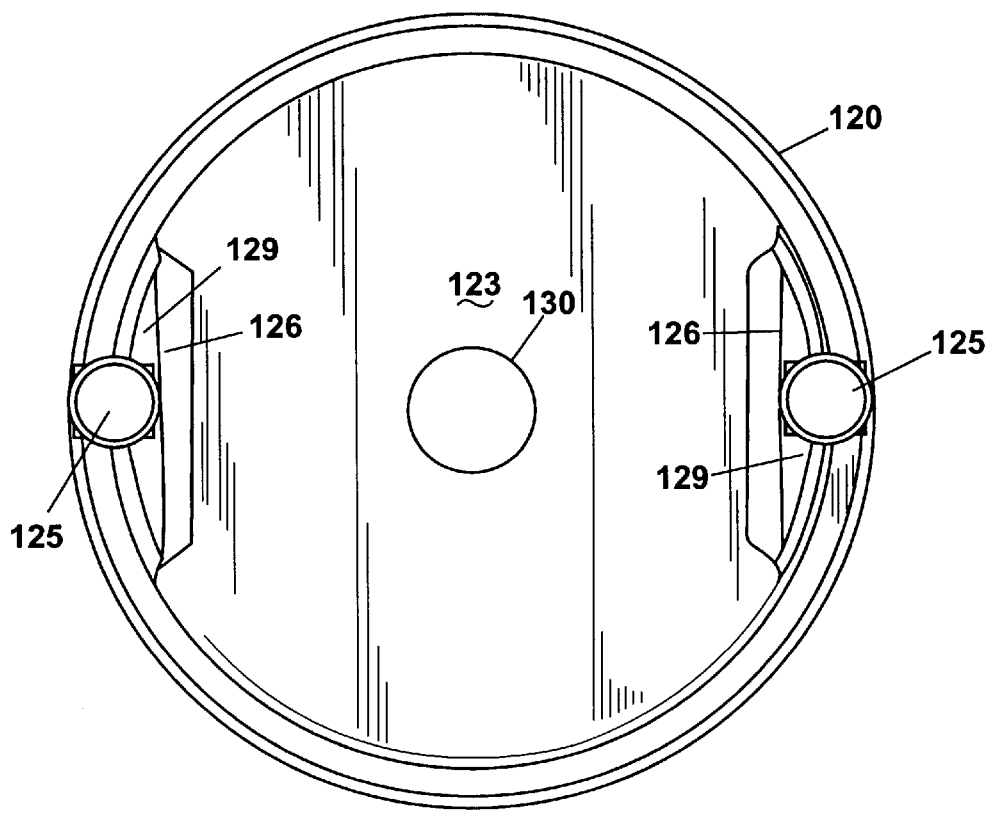
FIG. 5 is an end view of the housing taken along the line 5—5 of FIG. 4.

FIG. 5 is an end view of the housing section 120 of FIG. 4. The housing 120 is provided with a central opening 130 to accommodate the push rod 10, as shown in FIG. 1.

It will be understood that for yet smaller standard housings, e.g., for 9-inch brake actuators, the mounting studs will be secured to the housing by one or more extenders in order to maintain the predetermined distance between centers.

It will be appreciated that, by maintaining a standard predetermined distance between mounting studs regardless of brake actuator size, the mounting bracket will require fewer holes. Such holes are a source of corrosion and stress risers under service life conditions. Also, the cost of manufacturing brackets is less, as is the cost and complexity of fastening hardware. Also, a larger mounting stud center pattern on smaller brake actuators enables a more stable attachment and better resistance to unwanted vibrations. Additionally, mounting the studs directly to the vertical circumferential wall yields improved stress distribution of forces acting on the stud.

Reasonable variations and modifications of the foregoing embodiments are possible within the scope of the disclosure and drawings without departing from the spirit of the invention as defined in the claims.

The embodiments for which an exclusive property or privilege is claimed are defined as follows:

1. In a set of at least two brake actuators of different sizes in combination with a bracket for mounting each of said brake actuators, each said brake actuator being of the type having a housing with a central opening therein, a diaphragm spanning the housing and dividing the housing into a first chamber adapted to receive and exhaust pressurized air and a second chamber, a push rod extending through the opening and operably connected to the diaphragm to reciprocally actuate a brake in response to the receipt and exhaustion of fluid into the first chamber, and at least two mounting studs extending from the housing for mounting the brake actuator to said bracket, said bracket having corresponding apertures to receive the mounting studs, and at least one of the brake actuators having a diaphragm with a nominal effective area less than twenty in$^2$, the improvement in the set comprising:

the mounting studs on each of said housings being spaced from each other substantially the same distance from each other and having substantially the same spacial arrangement with respect to each other and the bracket apertures corresponding to the spacial arrangement and spacing of the mounting studs on each of said housings, whereby differently sized brake actuators can be interchangeably mounted to the same bracket via the corresponding apertures.

2. A set of at least two brake actuators according to claim 1 wherein the bracket stud apertures are no greater in number than the number of studs on each of the housings.

3. A set of brake actuators according to claim 1 wherein the mounting studs of one of said brake actuators extend through apertures in the housing and are secured to an interior surface of the housing.

4. A set of brake actuators according to claim 3 wherein the mounting studs of a second of said brake actuators are secured to an exterior surface of the housing.

5. A set of brake actuators according to claim 4 wherein the housing of the second of the brake actuators has a reduced diameter outer section on opposite sides thereof, and a mounting stud is secured to each reduced diameter outer section.

6. A set of brake actuators according to claim 4 wherein the mounting studs are secured to the housing by welding.

7. A set of brake actuators according to claim 5 wherein each reduced diameter outer section has a planar portion, and each mounting stud has a planar surface thereon which abuts the reduced diameter outer section planar surface and is welded thereto.

8. A set of brake actuators according to claim 1 wherein the mounting studs of one of said brake actuators are secured to an exterior surface of its respective housing.

9. In a set of at least two brake actuators of different sizes in combination with a bracket for mounting each of said brake actuators, each said brake actuator being of the type having a housing with a central opening therein, a push rod extending through the opening and reciprocally operable to actuate a brake in response to the movement of fluid into the housing, and at least two mounting studs extending from the housing for mounting the brake actuator to said bracket, said bracket having corresponding apertures to receive the mounting studs, the improvement in the set comprising:

the mounting studs of a second of said brake actuators are secured to an exterior surface of the housing; and the mounting studs on each of said housings being spaced from each other substantially the same distance from each other and having substantially the same spacial arrangement with respect to each other and the bracket apertures corresponding to the spacial arrangement and spacing of the mounting studs on each of said housings, whereby differently sized brake actuators can be interchangeably mounted to the same bracket via the corresponding apertures.

10. A set of brake actuators according to claim 9 wherein the housing of the second of the brake actuators has a reduced diameter outer section on opposite sides thereof, a mounting stud is secured to each reduced diameter outer section.

11. A set of brake actuators according to claim 10 wherein each reduced diameter outer section has a planar portion, and each mounting stud has a planar surface thereon which abuts the reduced diameter outer section planar surface and is welded thereto.

12. A set of brake actuators according to claim 9 wherein the mounting studs are secured to the housing by welding.

13. A set of at least two brake actuators according to claim 9 wherein the bracket stud apertures are not greater in number than the number of studs on each of the housings.

14. A set of brake actuators according to claim 9 wherein the mounting studs of one of said brake actuators extend through apertures in the housing and are secured to an interior surface of the housing.

15. A set of at least two brake actuators of different sizes in combination with a bracket for mounting each of said brake actuators, each said brake actuator being of the type having a housing with a central opening therein, a push rod extending through the opening and reciprocally operable to actuate a brake in response to the movement of fluid into the housing, and at least two mounting studs extending from the housing for mounting the brake actuator to said bracket, said bracket having corresponding apertures to receive the mounting studs, the improvement in the set comprising:

the mounting studs of one of said brake actuators are secured to an exterior surface of its respective housing; and the mounting studs on each of said housings being spaced from each other substantially the same distance from each other and having substantially the same spacial arrangement with respect to each other and the bracket apertures corresponding to the spacial arrangement and spacing of the mounting studs on each of said housings, whereby differently sized brake actuators can be interchangeably mounted to the same bracket via the corresponding apertures.

16. A set of brake actuators according to claim 15 wherein the housing of the second of the brake actuators has a reduced diameter outer section on opposite sides thereof, a mounting stud is secured to each reduced diameter outer section.

17. A set of brake actuators according to claim 16 wherein each reduced diameter outer section has a planar portion, and each mounting stud has a planar surface thereon which abuts the reduced diameter outer section planar surface and is welded thereto.

18. A set of brake actuators according to claim 15 wherein the mounting studs are secured to the housing by welding.

19. A set of at least two brake actuators according to claim 15 wherein the bracket stud apertures are not greater in number than the number of studs on each of the housings.

20. A set of brake actuators according to claim 9 wherein the mounting studs of one of said brake actuators extend through apertures in the housing and are secured to an interior surface of the housing.

21. In a set of at least two brake actuators of different sizes and being adapted to mount to a bracket having apertures, each said brake actuator being of the type having a housing with a central opening therein, a diaphragm spanning the housing and dividing the housing into a first chamber adapted to receive and exhaust pressurized air and a second chamber, a push rod extending through the opening and operably connected to the diaphragm to reciprocally actuate a brake in response to the receipt and exhaustion of fluid into the first chamber, and at least two mounting studs extending from the housing for mounting the brake actuator to said bracket, and at least one of the brake actuators having a diaphragm with a nominal effective area less than twenty $in^2$, the improvement in the set comprising:

the mounting studs on each of said housings being spaced from each other substantially the same distance from each other and having substantially the same spacial arrangement with respect to each other and with respect to the bracket apertures, whereby differently sized brake actuators can be interchangeably mounted to the same bracket via the corresponding apertures.

22. A set of brake actuators according to claim 21 wherein the mounting studs of one of said brake actuators extend through apertures in the housing and are secured to an interior surface of the housing.

23. A set of brake actuators according to claim 22 wherein the mounting studs of a second of said brake actuators are secured to an exterior surface of the housing.

24. A set of brake actuators according to claim 23 wherein the housing of the second of the brake actuators has a reduced diameter outer section on opposite sides thereof, and a mounting stud is secured to each reduced diameter outer section.

25. A set of brake actuators according to claim 23 wherein the mounting studs are secured to the housing by welding.

26. A set of brake actuators according to claim 24 wherein each reduced diameter outer section has a planar portion, and each mounting stud has a planar surface thereon which abuts the reduced diameter outer section planar surface and is welded thereto.

27. A set of at least two brake actuators according to claim 21 wherein the mounting studs of one of said brake actuators are secured to an exterior surface of its respective housing.

* * * * *